US007039910B2

(12) United States Patent
Kosche et al.

(10) Patent No.: US 7,039,910 B2
(45) Date of Patent: May 2, 2006

(54) TECHNIQUE FOR ASSOCIATING EXECUTION CHARACTERISTICS WITH INSTRUCTIONS OR OPERATIONS OF PROGRAM CODE

(75) Inventors: Nicolai Kosche, San Francisco, CA (US); Christopher P. Aoki, Los Altos, CA (US); Peter C. Damron, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 553 days.

(21) Appl. No.: 10/050,387

(22) Filed: Jan. 16, 2002

(65) Prior Publication Data

US 2003/0101443 A1  May 29, 2003

Related U.S. Application Data

(60) Provisional application No. 60/333,857, filed on Nov. 28, 2001.

(51) Int. Cl.
*G06F 9/45* (2006.01)

(52) U.S. Cl. ............... 717/158; 717/130; 717/131; 717/154; 717/159

(58) Field of Classification Search ......... 717/124–167
See application file for complete search history.

(56) References Cited

U.S. PATENT DOCUMENTS

| | | | |
|---|---|---|---|
| 5,964,867 A | 10/1999 | Anderson et al. | |
| 6,092,180 A | 7/2000 | Anderson et al. | |
| 6,289,506 B1 * | 9/2001 | Kwong et al. | ............. 717/148 |
| 6,314,431 B1 | 11/2001 | Gornish | |
| 6,427,235 B1 | 7/2002 | Kosche et al. | |

FOREIGN PATENT DOCUMENTS

WO   WO 01/44927 A2   6/2001

OTHER PUBLICATIONS

Venners et al., "The Hotspot Virtual Machine", Artima Developer, http://www.artima.com, pp. 1-6, May 1998.*
Alpern et al., "The Jalapeno Virtual Machine", IBM Systems Journal, pp. 211-238, 2000.*
White paper, "The Java HotSpot Engine Architecture", http://java.sun.com/products/whitepaper.html, pp.: 1-5, Apr. 1999.*
Armstrong, "HotSpot: A new breed of virtual machine", Java World, http://www.javaworld.com, pp.: 1-10, 1998.*
J. Anderson et al., "Transparent, Low-Overhead Profiling on Modern Processors," *Proceedings of the Workshop on Profile and Feedback-Directed Compilation* in conjunction with International Conf. on Parallel Architectures and Compilation Techniques (PACT98), Paris, France, Oct. 13, 1998, 5 pp.

(Continued)

*Primary Examiner*—Ted T. Vo
(74) *Attorney, Agent, or Firm*—Zagorin O'Brien Graham LLP

(57) ABSTRACT

By maintaining consistency of instruction or operation identification between code prepared for profiling and that prepared using profiling results, efficacy of profile-directed code optimizations can be improved. In particular, profile-directed optimizations based on stall statistics are facilitated in an environment in which correspondence maintained between (i) instructions or operations whose execution performance may be optimized (or which may provide an opportunity for optimization of other instructions or operations) and (ii) particular instructions or operations profiled.

61 Claims, 5 Drawing Sheets

OTHER PUBLICATIONS

Compaq (Digital) Continuous Profiling Infrastructure (DCPI) 1999, [online] [Retrieved from the Internet Dec. 20, 2002] URL<http://www.tru64unix.compaq.com/dcpi> and <http://www.research.compaq.com/SRC/dcpi>, 8 pp.

* cited by examiner

TECHNIQUE FOR ASSOCIATING EXECUTION CHARACTERISTICS WITH INSTRUCTIONS OR OPERATIONS OF PROGRAM CODE

CROSS REFERENCE TO RELATED APPLICATIONS

This application is related to (1) U.S. patent application Ser. No. 09/996,088 entitled "AGGRESSIVE PREFETCH OF ADDRESS CHAINS," naming Peter Damron and Nicolai Kosche as inventors, and filed 28 Nov. 2001 and to (2) U.S. patent application Ser. No. 10/050.358 entitled "TECHNIQUE FOR ASSOCIATING INSTRUCTIONS WITH EXECUTION EVENTS," naming Nicolai Kosche, Brian J. Wylie, Christopher P. Aoki, and Peter C. Damron as inventors, filed on even date herewith Each of the related applications is incorporated herein by reference in its entirety.

BACKGROUND

1. Field of the Invention

The present invention relates to techniques to associate execution characteristics of program code with particular instructions or operations thereof and, in particular, to techniques that facilitate preparation and/or optimization of program code based at least in part on execution characteristics collected and associated with particular instructions or operations thereof.

2. Description of the Related Art

Code profiling techniques have long been used to gain insight into execution performance of computer programs. Often, such insights are valuable and allow programmers to improve the execution performance of their computer programs. Indeed, a large body of work exists in the field of profiling. In general, two major classes of techniques exist: code instrumentation and hardware assisted profiling. Code instrumentation techniques typically include the insertion of instructions into the instruction stream of a program to be profiled. In crude form, programmer insertion of print source statements may be employed to profile code. More sophisticated approaches may employ compiler facilities or options to insert appropriate instructions or operations to support profiling. Upon execution of the instrumented code, execution characteristics are sampled, in part by operation of the added instructions. Typically, code instrumentation techniques impose overhead on original program code so instrumented and, unfortunately, the insertion of instructions into the instruction stream may itself alter the behavior of the program code being sampled.

Hardware assisted profiling techniques have been developed, in part, to address such limitations by off loading some aspects to dedicated hardware such as event counters. Practical implementations often employ aspects of code instrumentation and hardware assistance. In some cases, profiling support is included in, or patched into, exception handler code to avoid imposing overhead on each execution of a sampled instruction. Suitable hardware event counters are provided in advanced processor implementations such as those in accordance with the SPARC® and Alpha processor architectures. SPARC architecture based processors are available from Sun Microsystems, Inc, Palo Alto, Calif. SPARC trademarks are used under license and are trademarks or registered trademarks of SPARC International, Inc. in the United States and other countries. Products bearing SPARC trademarks are based upon an architecture developed by Sun Microsystems. Systems that include Alpha processors are available from a number of sources including Compaq Computer Corporation.

One reasonably comprehensive hardware assisted profiling environment is provided by the Digital Continuous Profiling Infrastructure (DCPI) tools that run on Alpha processor systems to provide profile information at several levels of granularity, from whole images down to individual procedures and basic blocks on down to detailed information about individual instructions, including information about dynamic behavior such as cache misses, branch mispredicts and other forms of dynamic stalls. Detailed information on the DCPI tools and downloadable code may be found (at least as of the filing date) online. Additional descriptive information appears in Jennifer Anderson, Lance Berc, George Chrysos, Jeffrey Dean, Sanjay Ghemawat, Jamey Hicks, Shun-Tak Leung, Mitch Lichtenberg, Mark Vandevoorde, Carl A. Waldspurger, William E. Weihl, "Transparent, Low-Overhead Profiling on Modem Processors," in *Proceedings of the Workshop on Profile and Feedback-Directed Compilation in conjunction with the International Conference on Parallel Architectures and Compilation Techniques (PACT 98)*, Paris, France (Oct. 13, 1998).

One longstanding goal of compiler writers has been to utilize profiling results in subsequent preparation and/or optimizations of profiled program code. Unfortunately, utilization of profile information can be difficult, particularly at the instruction-level desirable for optimizations related to processor or pipeline stall conditions. One significant challenge is the preparation of an executable for use in a measurement or collection phase, where execution behavior of the collection phase executable is itself representative or predictive of execution behavior of production code. Another challenge is establishing correspondence between profiled execution behavior and instructions, operations or sequences of instructions or operations that can be optimized.

SUMMARY

It has been discovered that by maintaining consistency of instruction or operation identification between code prepared for profiling and that prepared using profiling results, efficacy of profile-directed code optimizations can be improved. In particular, profile-directed optimizations based on stall statistics are facilitated in an environment in which correspondence maintained between (i) instructions or operations whose execution performance may be optimized (or which may provide an opportunity for optimization of other instructions or operations) and (ii) particular instructions or operations profiled.

In some realizations, correspondence is maintained at least in part through the use of instruction identifiers or tags for which valid associations persist or are propagated through optimizations employed in the preparation of an executable for profiling. Preferably, a substantial portion of the code optimizations to be performed (save those to be directed by profile results) are made in a first executable for profiling. The approach provides a first executable for profiling that will produce execution events that are representative of a second executable instance in which a full set of optimizations (including those influenced by profile data) are performed. As long as a mapping is maintained between tags or other identifiers and instructions or operations of a program representation that forms a basis for preparation of the second executable, profile-directed optimizations may be effectively made.

In some realizations, the mapping of tags to a program representation is kept simple by assigning tags before optimization begins and by disallowing upstream changes to either source code or optimizations applied in the preparation of the first executable. In some realizations, preparation of the second executable instance uses the tagged first executable instance as its input. Alternatively, identical or equivalent initial preparation steps can be employed. In either case, the identifications or tags used in preparation of the second executable will be identical (or at least correspond) to those associated with instructions or operations of the first executable. Accordingly, the mapping of collected execution events to instructions or operations of an input program representation used for preparation of the second executable instance is straightforward. One simple tagging technique uses source code line numbers. A sometimes preferable technique is to use a character, or other position, in source code. If particular instruction types are of interest, e.g., memory access instructions, an instruction count or index, e.g., load operation N, may be convenient. In realizations for which optimizations are performed on binary executables, instruction addresses may be convenient. In general, any of a variety of identification or tagging schemes may be employed.

In some realizations, the desired tags or identifications are included in a table (or other association) of tags and instruction addresses encoded with the executable. Profiling associates an event with an instruction address, and then uses the table to associate the instruction address with a tag. In some realizations, profiling creates another table (or association) of tags and profile data. Then, preparation of the second executable determines the appropriate tags for instructions or operations of program code and performs a lookup of profile data for each such tag to associate profile or event data with instructions. By maintaining consistency of instruction identification, profile-directed compilation, optimization and/or scheduling techniques are facilitated.

Techniques of the present invention may be employed in the performance of particular program code optimizations. For example, prefetch optimizations may be tailored based on observed instruction-level cache miss statistics. In some realizations, techniques of the present invention may be employed to identify candidate martyr memory operations that provide memory system latency into which prefetch operations may be advantageously placed to improve overall code performance. More generally, any of a variety of likely-to-stall instructions or operations may be identified and corresponding optimizations performed.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The description that follows includes exemplary systems, methods, techniques, instruction sequences and computer program products that embody techniques of the present invention. In some realizations, instruction sequences and computer program products in accordance with the present invention are made using such techniques. For purposes of description, certain aspects of the present invention are detailed in the context of instruction sequences that include load-type memory access instructions with which cache miss execution events may be associated using backtracking techniques. More generally, other target instructions or operations may be associated with execution events using techniques of the present invention. In much of the description that follows, branch target locations are illustrative instances of the general class of ambiguity creating locations. However, more generally, other program constructs may create ambiguity when interposed between a target instruction or operation and a point in the instruction sequence coinciding with detection of an execution event.

Accordingly, in view of the above and without limitation, the description that follows focuses on a particular illustrative context in which delayed detections of cache miss events are associated with corresponding memory access instructions, while considering, obviating or mitigating effects of intervening, ambiguity creating branch target locations. Other exploitations and realizations will be understood in the context of the description and the claims that follow.

Figure 1:
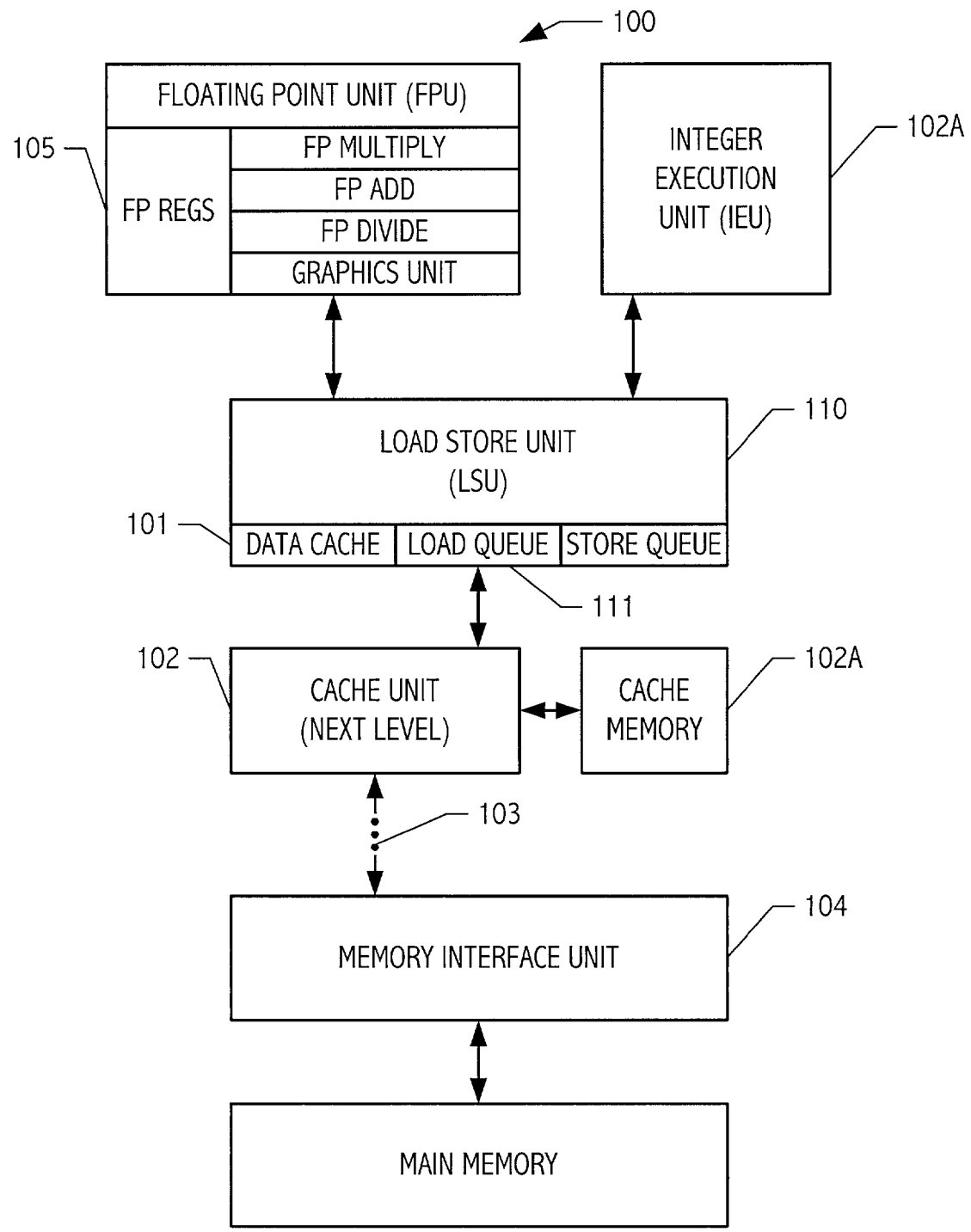
FIG. 1 depicts functional units of an illustrative processor architecture that may provide hardware assist for profiled execution events.

FIG. 1 depicts functional units of an illustrative processor 100 in which pipeline depth may contribute to delayed detection of execution events such as cache misses. Profile-directed compilation techniques may be employed to prepare and/or optimize code for execution on processor 100 and, in some embodiments in accordance with the present invention, backtracking techniques may be employed to associate such execution events (or aggregations thereof) with particular instructions of the code and thereby guide code optimizations. For example, processor 100 includes a memory hierarchy for which latencies of some memory access instructions may be at least partially hidden using judicious placement of prefetch instructions as long as likely cache misses or other likely to stall conditions can be identified. Techniques in accordance with the present invention are particularly useful for the associating of cache misses with particular instructions in the presence of code optimizations so that cache miss likelihoods can be estimated.

The memory hierarchy of processor 100 includes an on-board data cache 101 associated with a load/store unit 110 of the processor as well as a next level cache 102, 102A, main memory 104 and any intervening levels 103 (not specifically shown) of additional cache or buffering. Persons of ordinary skill in the art will appreciate that in such hierarchies, latencies for memory accesses serviced from main memory rather than from cache, can be substantial. Accordingly, the payoff for reliably estimating cache miss likelihoods and, where possible hiding memory access latency, can be significant. While any of a variety of optimizations may benefit from techniques of the present invention, prefetch optimizations are illustrative. In this regard, the above-incorporated U.S. Patent Application entitled "Aggressive Prefetch of Address Chains," naming Peter C. Damron and Nicolai Kosche and filed 28, Nov. 2001, describes illustrative prefetch techniques that may benefit from techniques of the present invention that facilitate the association of instructions or operations with execution events, even in the presence of detection latencies. In particular, the above-incorporated patent application describes prefetch optimizations that exploit memory access latencies of "martyr operations." Candidate martyr operations, including likely-to-miss memory access instructions may be identified using techniques in accordance with the present invention.

Figure 2A:
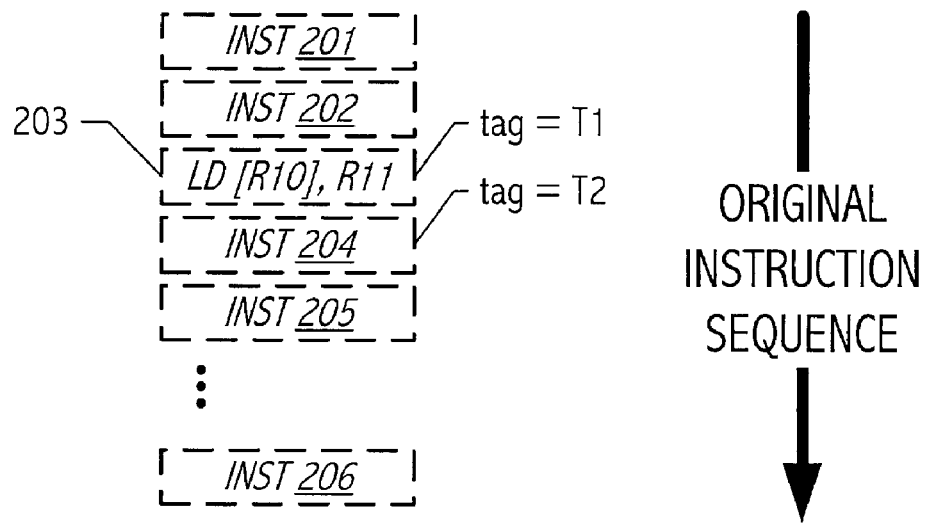
FIG. 2A and FIG. 2B depict a pair of corresponding instruction sequences that include a target load instruction for which association of a detected cache miss execution event may be complicated (in the profiled sequence) by presence of optimizations that rearrange instruction order.
Figure 2B:
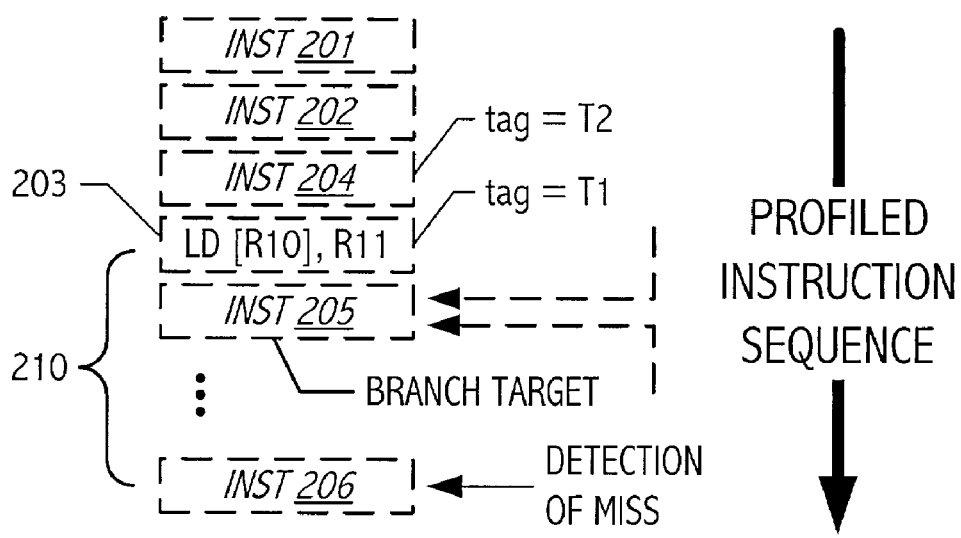

FIGS. 2A and 2B illustrate how optimizations performed as part of the preparation of an executable for profiling may tend to make the association of an execution event (e.g., a cache miss event) with the triggering instruction difficult. For example, if instruction 204 is a load instruction, tagged T2, that appears in the original instruction sequence after load instruction 203, tagged T1, and if load instruction 204 is scheduled ahead of load instruction 203 as part of the optimizations performed in the preparation of an executable for profiling (e.g., as illustrated in FIG. 2B), then it may be difficult to determine whether a cache miss event is properly associated with instruction 203 or 204. In the illustrated instruction sequences, the tagging of instructions (which is consistent between the original instruction sequence and the profiled instruction sequence) facilitates the use of an association between an execution event and a particular instruction of the profiled instruction sequence in the preparation of a second executable. For example, in the preparation of a second executable based on the original instruction sequence, certain additional optimizations (e.g., prefetch optimizations such as described above) may be performed using the profile-based association of load instruction 203 (tagged T1) with a cache miss likelihood.

While a variety of techniques may be employed to associate particular execution events with particular tag-identified instructions, some embodiments in accordance with the present invention employ techniques described in greater detail in the above-incorporated U.S. patent application Ser. No. 10/050,358 entitled "TECHNIQUE FOR ASSOCIATING INSTRUCTIONS WITH EXECUTION EVENTS," and naming Nicolai Kosehe, Brian J. Wylie, Christopher P. Aoki and Peter C. Damron as inventors, filed on even date herewith. Such techniques address certain challenges associated with delayed event detection and ambiguity creating locations in an instruction sequence. By way of example, FIG. 2B illustrates an instruction sequence executable on a processor such as that illustrated in FIG. 1. The instruction sequence includes a load instruction 203 for which association of a detected cache miss execution event may be complicated by the presence of an ambiguity creating location. Absent the ambiguity creating location, backtracking from the miss detection to load instruction 203 is straightforward. However, in the illustrated case, interposed instruction 205 is a branch target of one or more branch or control transfer instructions (not specifically shown). Because detection of a cache miss corresponding to load instruction 203 is delayed (e.g., by detection lag 210), and because the branch target location is interposed between the target load instruction and a point in the instruction sequence (namely, instruction 206) that coincides with detection of the cache miss, execution path ambiguity complicates the association of the detected cache miss with load instruction 203. Absent additional information, it is unclear whether the actual execution that caused the cache miss took a path that includes instructions 203, 204, 205, . . . 206, or whether actual execution arrived at instruction 205 via a branch or other control transfer. In the latter case, some memory access instruction other than load instruction 203 caused the detected cache miss and it should not be associated with instruction 203.

In general, the above-described ambiguity may be handled in any of a variety of ways. For example, in some realizations, ambiguity-creating locations are identified and execution event detections so-affected are simply ignored in code profiling. In this way, only non-ambiguous detections are included in data collection results. In some realizations, additional information (such as from a branch history queue maintained by the processor or ancillary to the profiling implementation) can be employed to bridge certain ambiguity-creating locations. For example, using data from a branch history queue, execution paths through at least some otherwise ambiguous locations can be better determined. In some realizations, programming constructs that would otherwise create execution path ambiguity may be obviated by insertion of padding instructions sufficient to provide an unambiguous skid region, thereby covering the expected detection lag. Although backtracking techniques, ambiguity bridging techniques and/or skid regions may be employed in some embodiments of the present invention, other embodiments may employ other event association techniques (including conventional techniques) to similar ends.

Figure 3:
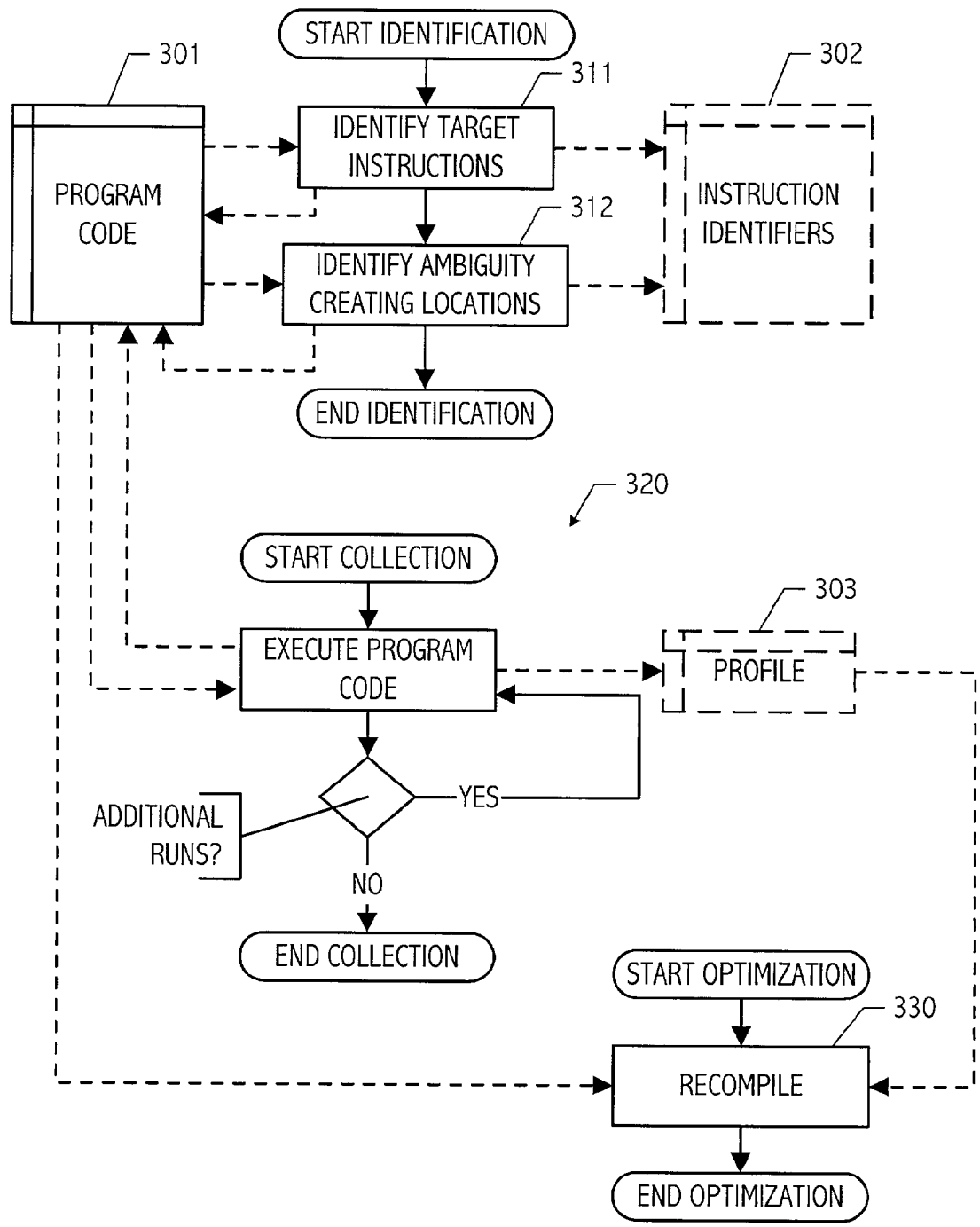
FIG. 3 is a flow chart of a process in accordance with some embodiments of the present invention by which an instruction sequence is prepared for profiling, profile data is collected and optimized code is prepared (or re-prepared) based thereon. For purposes of illustration, instruction identification, collection and code optimization are depicted as separable phases although they need not be in all realizations.

FIG. 3 is a flow chart of a process (or processes) by which an instruction sequence is prepared for profiling, by which profile data is collected and by which optimized code is prepared (or re-prepared) based on the collected data. Identification, collection and optimization facilities may be implemented and/or performed separately, or in combination with one or both of the others. Program code 301 includes any of a variety of embodiments of an original instruction sequence (such as illustrated in FIG. 2) including as compiled code, schedulable code (e.g., an intermediate compiler form) in which memory operations have been made explicit, virtual machine instructions, etc. Target instructions in the original instruction sequence are identified (311) and instruction identifiers are appropriately stored. In some realizations, a separate store of instruction identifiers 302 may be maintained. Alternatively, or in addition, instruction identifiers may be encoded in the program code itself. Such an approach may be particularly attractive in realizations where program code 301 is represented in an intermediate data structure of a compiler or other code preparation facility. Ambiguity-creating locations in the original instruction sequence are identified (312) and instruction identifiers are appropriately stored. As with target instructions, ambiguity-creating locations may be represented in a separate store of instruction identifiers 302 or encoded in the program code itself, or both.

The set of relevant target instructions is, in general, program code dependent and implementation specific. However, for a desired set of event detections, determination of the relevant set is straightforward. For example, focusing illustratively on a memory access related execution event set characteristic of the UltraSPARC III processor, data cache read misses (or hits), data cache write misses (or hits), load/store stall cycles, and store queue stall cycles may be of interest. In some cases, execution events may differentiate between events (e.g., misses, stalls, etc.) at various pipeline stages. Although the relevant corresponding sets of target instructions are processor instruction set specific, persons of ordinary skill in the art will appreciate appropriate correspondence based on the following example(s). Generally, corresponding target instruction(s) for a data cache write miss execution event are the various store-type instructions implemented by a particular processor architecture. Similarly, corresponding target instruction(s) for a data cache read miss execution event are the various load-type instructions. Data cache stall cycle execution events may correspond to either load-type or store-type instructions. As a practical matter, not all load or store instructions may be viable target instructions. For example, subsequent loads or stores to the same cache line may be eliminated as candidate targets.

In some realizations, execution events may include events not associated with memory access (e.g., pipeline stalls, exception conditions, etc.) for which corresponding instruction targets may be identified. In general, correspondence of execution events with candidate target instructions will vary based on processor architecture and implementation. However, based on the description herein, persons of ordinary skill in the art will appreciate sets of execution events and corresponding target instructions suitable for a particular implementation.

The set of relevant ambiguity-creating locations is also program code dependent and implementation specific. However, in practice, most ambiguities trace to control transfers. For example, branch target locations, entry point locations, jump target locations, indirect branch target locations, trap handler locations, interrupt handler locations, etc. may all create execution path ambiguity. Based on the description herein, persons of ordinary skill in the art will appreciate sets of ambiguity-creating locations suitable for a particular implementation.

Referring again to FIG. 3, program code 301 (or executable code corresponding thereto) is executed to generate event profile information. Any of a variety of conventional profiling methods may be employed. For example, in a typical hardware assisted profiling environment, particular instances of an event type (e.g., a statistically sampled occurrence of a particular type of cache miss) triggers a sampling of an execution event (e.g., based on overflow of a corresponding hardware counter). Whatever the particular technique employed, execution event information may be accumulated in a separate profile store 303 and/or represented in conjunction with program code 301.

Collection associates particular occurrences of an execution event with a coinciding point in the original execution sequence of program code 301. Often, multiple program runs, perhaps involving differing data sets, will be employed to generate profile data. For purposes of description, either an underlying execution event itself (e.g., a read miss in the level N data cache) or an associated hardware event (e.g., overflow or underflow of an associated counter) may be viewed as the execution event with which a point in the original execution sequence of program node 301 coincides. Often, a program counter value serves to identify the coinciding point.

Figure 5:
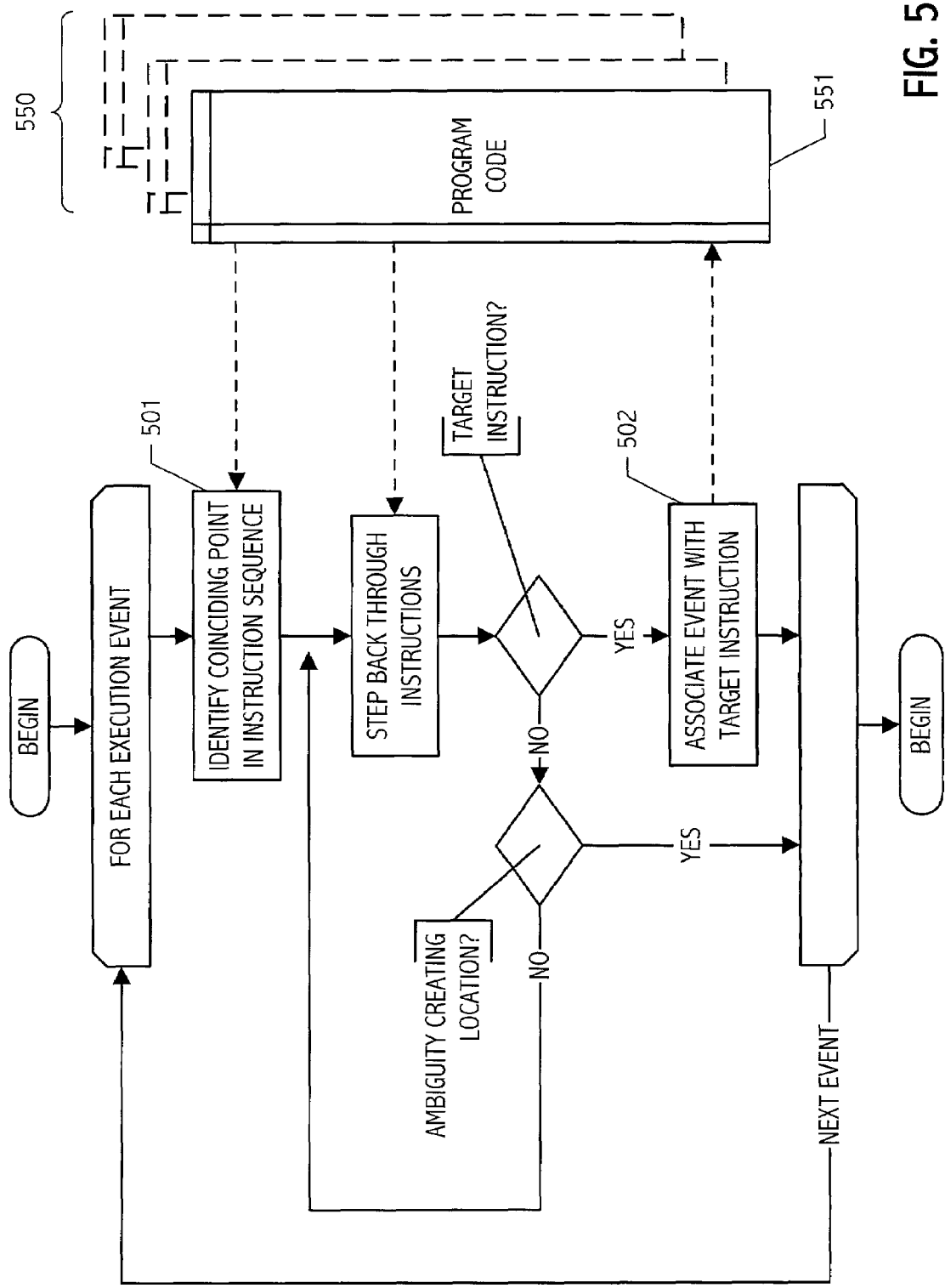
FIG. 5 is a flow chart illustrating techniques whereby target instructions can be associated with event detections using a backtracking technique.

Based on the coinciding points and on the previously identified target instructions and ambiguity-creating locations, collection 320 attempts to associate detections of a particular execution event with a proper target instruction from the original execution sequence of program code 301. A backtracking technique is illustrated in FIG. 5; however, at least some suitable techniques will be understood as follows. Beginning at the coinciding point for a particular execution event detection, collection steps back through the original execution sequence in an attempt to find a preceding target instruction (i.e., an instruction of appropriate type to have triggered the detected event). In some realizations, an expected displacement is reasonably fixed and may place an upper bound on the backtracking (e.g., no backtracking may be required). If no intervening ambiguity-creating location is encountered, association is straightforward. When an intervening ambiguity-creating location such as a branch target is encountered, then the particular execution event instance may be ignored in the preparation of profile data. Alternatively, if some facility such as a branch history queue is provided, it may be possible to resolve the ambiguity and backtrack along a proper execution path.

In either case, profile data is accumulated for identified target instructions. Typically, profile data is aggregated to provide a statistically valid characterization of individual target instructions based on criteria corresponding to the detected execution event. For example, a particular instruction for which collection indicates a normalized cache miss rate above a predetermined value maybe deemed to be a "likely cache miss." Other suitable characterizations are analogous.

Depending on the implementation, the original instruction sequence of program code 301 may optimized, e.g., through recompilation 330, based on profile data 303. As previously described, some exploitations may encode profile data (or instruction characterizations corresponding thereto) in program code 301, e.g., as compiler hints.

For purposes of illustration, instruction identification, collection and code optimization are depicted as separable phases although they need not be in all realizations. Also, although some realizations in accordance with FIG. 3 reduce profile data to a characterization (e.g., likely cache hit or likely cache miss) suitable use by a compiler in optimization decisions, other realizations may provide such data (or even raw or less processed precursors thereof) for programmer feedback or to a compiler, profiler suite or other code development tool. As a general matter, particular selections, aggregations and or characterizations of profile data are matters of design choice and any of a variety of choices is suitable.

Figure 4:
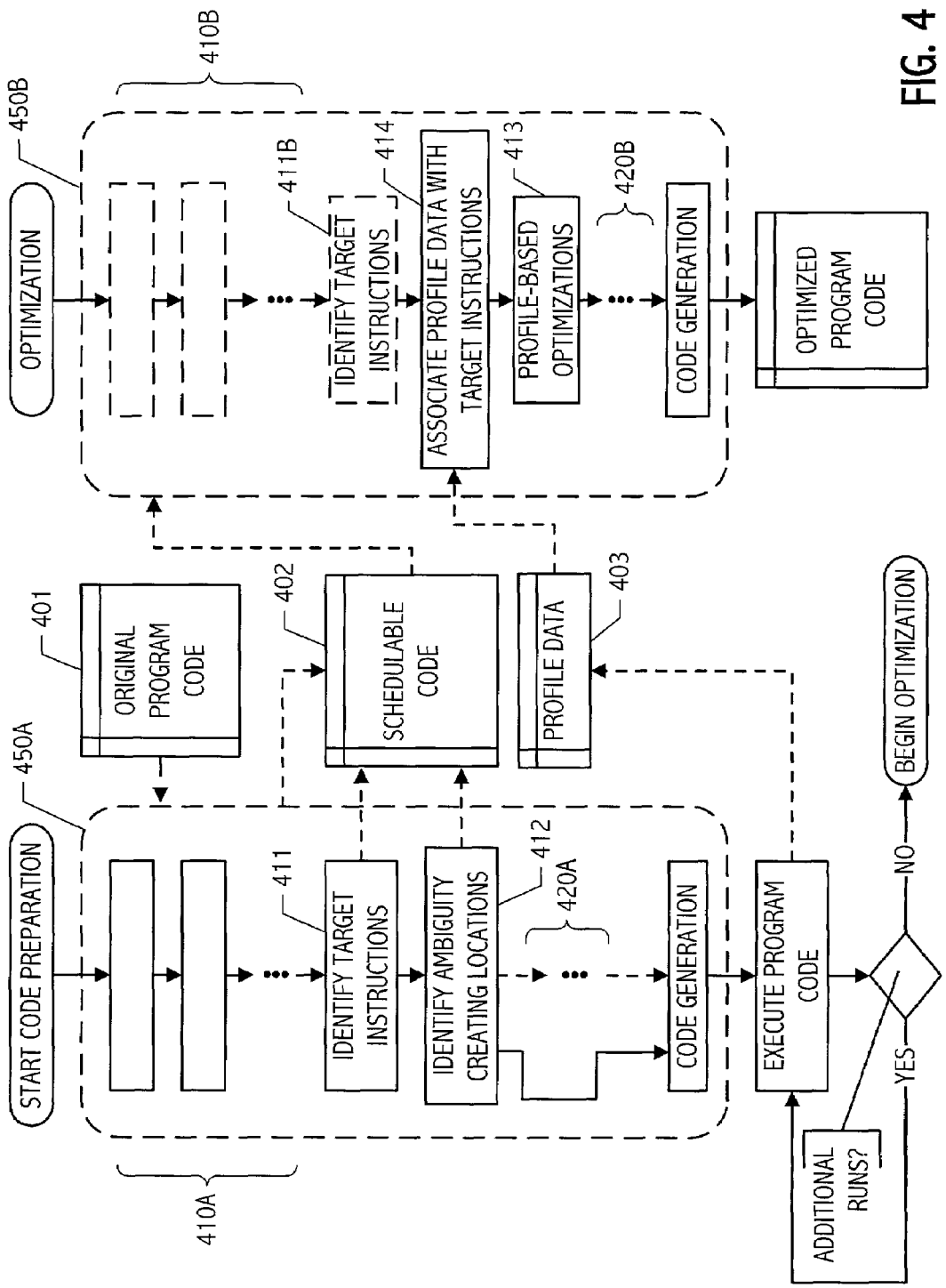
FIG. 4 is a flow chart illustrating techniques in accordance with some embodiments of the present invention whereby executable code is prepared for profiling (e.g., by a feedback directed optimizing compiler) in which certain later stages of optimization are initially forgone, then, based on profile data obtained, are performed to generate optimized program code. In general, the forgone optimizations may include those that are based on profile information and those that tend to complicate or interfere with data collection and/or association with instructions.

The flow chart of FIG. 4 illustrates a variation on the techniques previously described whereby executable code is prepared for profiling (e.g., by a feedback directed optimizing compiler) in which certain later stages of optimization are initially forgone. Then, based on profile data obtained, these previously forgone optimizations are performed to generate optimized program code. Original program code 401 includes any of a variety of functional program representations that include an original instruction sequence (such as illustrated in FIG. 2) including as compiled code, schedulable code (e.g., an intermediate compiler form) in which memory operations have been made explicit, virtual machine instructions, etc.

Using techniques in accordance with the present invention, executable code is prepared for data collection then optimized (or re-optimized) based on collected data. In some realizations, code preparation functionality 450A and 450B are provided by successive executions of a single optimizing compiler implementation, typically with differing optimization levels or selections. In other realizations, separate facilities may be employed. In the case of a combined facility, code preparation functionality 450A exercised during preparation of code for profiling may differ from code preparation functionality 450B exercised for optimization. In particular, while an initial set 410A of optimizations, e.g., loop unrolling, common sub-expression identification, dead code elimination, etc., are often performed prior to identifying (411, 412) target instructions and ambiguity-creating locations in original program code 401, certain additional optimizations 420A may be forgone in the preparation of code for profiling. Although not specifically illustrated, all optimizations need not be performed prior to identification (411, 412) of target instructions and/or ambiguity-creating locations. For example, identified instructions or locations may be propagated through all optimization steps, e.g., as duplicates after loop unrolling, in some implementations.

In general, the forgone optimizations include those that are based on profile information (e.g., prefetch optimizations that may be undertaken based on target instructions identified as likely-cache-misses or otherwise likely-to-stall) and those that tend to complicate or interfere with data collection and/or association with instructions. For example, in some realizations for SPARC processor architecture code, exploitation of delay slot instruction positions may be forgone in the preparation of code for profiling because of the typical proximity to ambiguity creating locations. But in general, the identification of target instructions 411 during code preparation 450A means that optimizations do not need to be forgone.

As before, profile data 403 is obtained based on program execution. Using the obtained data, certain profile-based optimizations (413) may be employed. As before, prefetch optimizations such as described in the above-incorporated U.S. Patent Application are illustrative, though realizations in accordance with the present invention are not limited thereto. In general, techniques of the present invention may be employed in any of a variety of profile-directed compiler, optimizer or scheduler configurations. As illustrated in FIG. 4, previously forgone optimizations may now be performed (420B). Depending on the implementation, the initial set (410A) of optimizations may be re-performed (410B) or an intermediate compiler data structure state of schedulable code 402 (e.g., that resulting from profile code preparation with profile data represented therein) may be employed as a starting point for the code preparation functionality 450B exercised for optimization. Similarly, identification of target instructions may be re-performed (411B) as part of an optimization (e.g., by code preparation functionality 450B) or, in some realizations, may be maintained or preserved from an initial preparation (e.g., by code preparation functionality 450A) and employed during optimization. In either case, identifications employed to associate (414) profile data with target instructions should be identical with (or at least correspond to) those made earlier (e.g., by code preparation functionality 450A) so that the associations correctly match profile data with target instructions.

FIG. 5 is a flow chart illustrating one suitable backtracking implementation. For each execution event, a coinciding point is identified (501) in an instruction sequence. Typically, the coinciding point is identified using a then current program counter value at or about the time or point of detection. More generally, any facility which establishes a coinciding point may be employed. Beginning at the coinciding point for a particular execution event detection, collection steps back through the instruction sequence in an attempt to find a preceding target instruction (i.e., an instruction of appropriate type to have triggered the detected event). As the backtracking progresses, if a target instruction is encountered without an intervening ambiguity-creating location, then the detected execution event is associated (502) with the target instruction. If, on the other hand, an intervening ambiguity-creating location is encountered, then the execution event is discarded and the process continues with the next execution event. In some realizations, an expected displacement is reasonably fixed and may place an upper bound on the backtracking. Also, as previously described, ancillary information (not specifically shown) such as from a branch history queue may be employed in some realizations to bridge ambiguity-creating locations and thereby backtrack along a proper execution path.

As before, target instructions and ambiguity-creating locations may be identified in a representation 551 of program code and/or in separate stores or data representations 550. Similarly, associations of execution events (or aggregated data based thereon) with identified target instructions may be added to a representation of the program code, e.g., as compiler hints, and/or represented in separate stores or data representations 550.

While the invention has been described with reference to various embodiments, it will be understood that these embodiments are illustrative and that the scope of the invention is not limited to them. Many variations, modifications, additions, and improvements are possible. For example, while much of the description herein has focused on the illustrative context of cache miss related execution events and memory access target instructions, applications to other execution events and related profiling are also envisioned. Similarly, although instruction profiling has been presumed, techniques described herein may be more generally applied to operations of processor, pipeline or execution unit, whether such operations correspond one-to-one with instructions of an instruction set or are lower-level or higher-level operations performed by a particular implementation of a target architecture. For example, based on the description herein, persons of ordinary skill in the art will appreciate extensions to operations executable by a microcoded processor implementation or virtual machine implementation.

More generally, realizations in accordance with the present invention have been described in the context of particular embodiments. These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A code preparation method comprising:
  identifying at least one instance of at least one operation in a first executable instance of code;
  executing the first executable instance of code and responsive to detection of an execution event, associating a corresponding execution characteristic with a corresponding identified operation instance; and
  preparing a second executable instance of the code based, at least in part, on the association between the execution characteristic and the identified operation instance,
  wherein the operation identification is consistent between the first executable instance and the preparation of the second executable instance.

2. The method of claim 1,
  wherein the consistency of operation identification is maintained from preparation of the first executable instance to preparation of the second executable instance.

3. The method of claim 1,
  wherein same unique identification numbers are assigned to corresponding operations of the first executable and the second executable.

4. The method of claim 3,
  wherein the execution characteristic is associated with the unique identification number.

5. The method of claim 3,
  wherein the unique identification numbers and their assignment to operations are maintained throughout any optimizations or code transformations performed in preparation of the first executable.

6. The method of claim 5,
  wherein the maintenance of the unique identification number assignments include further assigning the unique identification number to a copy when an operation is copied as part of a code transformation or optimization.

7. The method of claim 5,
  wherein the maintenance of the unique identification number assignments includes removing an assignment when the assigned operation is removed as part of a code transformation or optimization.

8. The method of claim 1,
  wherein the associating of the corresponding execution characteristic includes encoding aggregated hardware event information in an extended definition of an instruction instance for use in the preparation of the second executable instance.

9. The method of claim 1,
  wherein the identified operation is a memory access instruction.

10. The method of claim 1,
  wherein the execution characteristic includes a cache miss likelihood.

11. The method of claim 1,
  wherein the preparation includes inserting one or more prefetch operations in the code prior to the identified operation to exploit latency provided by servicing of a cache miss by the identified operation.

12. The method of claim 1, further comprising:
  preparing the first executable instance.

13. The method of claim 12,
  wherein the preparation of the first executable instance includes substantially all optimnizations operative in the preparation of the second executable.

14. The method of claim 13,
  wherein execution of the first executable instance corresponds substantially with execution of an executable instance of code prepared without the identifying.

15. The method of claim 13,
  whereby execution of the first executable instance sufficiently corresponds to that in an expected execution environment, so that the execution characteristic is applicable to the preparation of the second executable.

16. The method of claim 12,
  wherein the preparation of the first executable instance forgoes certain optimizations performed, after use of the association between the execution characteristic and the identified instruction, by the further preparing.

17. The method of claim 12,
  wherein the preparation of the first executable instance includes compilation of the code.

18. The method of claim 1,
  wherein both the first and the second executable instances are compiled instances of the code.

19. The method of claim 1,
  wherein the second executable instance is an optimization of the first executable instance.

20. The method of claim 1,
  wherein the preparing includes optimizations forgone in the first executable instance.

21. The method of claim 1,
  wherein the preparation of the second executable instance includes optimizations forgone in preparation of the first executable instance.

22. The method of claim 1,
  wherein at least the preparing is performed by an optimizing compiler.

23. The method of claim 1,
  wherein at least the preparing is performed by a binary translator.

24. The method of claim 1,
  wherein at least the preparing is performed by a binary rewriter.

25. The method of claim 1,
  wherein at least the preparing is performed by a binary optimizer.

26. The method of claim 1,
  wherein at least the preparing is performed by a just-in-time (JIT) compiler.

27. The method of claim 1,
  wherein the associating of the corresponding execution characteristic includes aggregating contributions of plural instances of the execution event.

28. The method of claim 1,
  wherein the associating of the corresponding execution characteristic includes backtracking from a point in the code that coincides with delayed detection of the execution event.

29. The method of claim 1,
  wherein the associating of the corresponding identified one of the operations includes reading or receiving a computer readable encoding of an event profile.

30. The method of claim 1,
  wherein the associating of the corresponding execution characteristic includes reading or receiving a computer readable encoding of an event profile.

31. The method of claim 1, further comprising:
preparing the second executable instance as a computer program product for distribution, transmission or execution.

32. The method of claim 31,
wherein the computer program product is encoded in one or more computer readable media selected from the set of a disk, tape or other magnetic, optical, semiconductor or electronic storage medium and a network, wireline, wireless or other communications medium.

33. An optimizing compiler that prepares a second executable instance of computer program code including optimizations in addition to those of a previously prepared first executable instance thereof, wherein the additional optimizations include performing one or more transformations based on run-time information from execution of the first executable instance, wherein consistency of instruction identification is maintained from preparation of the first executable instance to preparation of the second executable instance.

34. The optimizing compiler of claim 33,
wherein same unique identification numbers are assigned to corresponding operations of the first executable and the second executable.

35. The optimizing compiler of claim 34,
wherein the unique identification numbers and their assignment to operations are maintained throughout any optiniizations or code transformations performed in preparation of the first executable.

36. The optimizing compiler of claim 35,
wherein the maintenance of the unique identification number assignments include further assigning the unique identification number to a copy when an operation is copied as part of a code transformation or optimization.

37. The optimizing compiler of claim 35,
wherein the maintenance of the unique identification number assignments includes removing an assignment when the assigned operation is removed as part of a code transformation or optimization.

38. The optimizing compiler of claim 33,
wherein the transformations include insertion of one or more prefetch instructions.

39. The optimizing compiler of claim 33,
wherein the transformations include insertion of one or more non-faulting loads.

40. The optimizing compiler of claim 33,
wherein selection of optimizations performing in the preparation of the first executable instance is biased toward collection of data.

41. The optimizing compiler of claim 33,
wherein the additional optimizations performing in the preparation of the second executable instance are biased toward obtaining improved performance based on the run-time information.

42. The optimizing compiler of claim 33,
wherein transformations include insertion of instructions into the second executable instance to reduce latency of memory access operations that, based on the run-time information, are likely to miss in a cache.

43. The optimizing compiler of claim 33,
wherein the optimizing compiler prepares the second executable instance, but not the first.

44. The optimizing compiler of claim 33,
wherein the optimizing compiler also prepares the first executable instance of computer program code.

45. The optimizing compiler of claim 33, embodied as part of a binary translator.

46. The optimizing compiler of claim 33, embodied as part of a binary rewriter.

47. The optimizing compiler of claim 33, embodied as part of a binary optimizer.

48. The optimizing compiler of claim 33, embodied as a just-in-time (JIT) compiler.

49. The optimizing compiler of claim 33,
wherein first and second executions of the optimizing compiler respectively provide the first and second executable instances; and
wherein the transformations are performed in addition to optiniizations coextensive with those performed in the first executable instance.

50. The optimizing compiler of claim 33,
wherein the optimizing compiler identifies one or more memory access instructions in the first executable instance of the computer program code; and
wherein the ruh-time information encodes respective execution characteristics for respective ones of the identified memory access instructions.

51. The optimizing compiler of claim 33,
wherein collection of the run-time information includes aggregation of execution event information and association of the aggregated information with memory access instructions identified in the first executable instance of the computer program code.

52. The optimizing compiler of claim 33,
encoded in one or more computer readable media selected from the set of a disk, tape or other magnetic, optical, semiconductor or electronic storage medium and a network, wireline, wireless or other communications medium.

53. A computer program product encoded in one or more computer readable media, the computer program product comprising:
a first execution sequence; and
an information encoding associating an execution event with at least some operation of the first execution sequence, the associated execution event based at least in part on an execution profile of the first execution sequence of operations, wherein consistency of the association is maintained from preparation of the first executable instance for preparation of a second executable instance.

54. The computer program product of claim 53,
wherein the execution event is a cache miss likelihood.

55. The computer program product of claim 53,
wherein the associated operation is a memory access operation.

56. The computer program product of claim 53,
employed in an data structure of an optimizing compiler in preparation of an optimized instance of the execution sequence of operations, wherein the optimized instance includes one or more prefetch operations placed before particular ones of the memory access operations for which the associated information encoding indicates a cache miss likelihood.

57. The computer program product of claim 53,
wherein the one or more computer readable media are selected from the set of a disk, tape or other magnetic, optical, semiconductor or electronic storage medium and a network, wireline, wireless or other communications medium.

58. An apparatus comprising:

means for identifying in a first executable instance of computer program code certain operations thereof for inclusion in an execution profile;

means for collecting the execution profile; and means for preparing a second executable instance of the computer program code, wherein consistency of the identifying is maintained for operations thereof corresponding to the certain operations such that the corresponding certain operations are relatable to the execution profile.

59. The apparatus of claim 58, wherein the identifying includes producing a table of tags and operation addresses.

60. The apparatus of claim 58, wherein information for the identifying is encoded in a file or communications channel read by the means for collecting.

61. The apparatus of claim 58, further comprising: means for preparing the first executable instance of the computer program code.

\* \* \* \* \*

UNITED STATES PATENT AND TRADEMARK OFFICE
CERTIFICATE OF CORRECTION

PATENT NO.         : 7,039,910 B2
APPLICATION NO. : 10/050387
DATED              : May 2, 2006
INVENTOR(S)       : Kosche et al.

It is certified that error appears in the above-identified patent and that said Letters Patent is hereby corrected as shown below:

Column 1, line 40, the word "print" should read -- printf -- .

Column 14, line 21, the word "ruh" should read -- run -- .

Signed and Sealed this

Fifteenth Day of August, 2006

JON W. DUDAS
*Director of the United States Patent and Trademark Office*